US011282042B2

United States Patent
Bhattacharya et al.

(10) Patent No.: US 11,282,042 B2
(45) Date of Patent: Mar. 22, 2022

(54) ARTIFICIAL INTELLIGENCE FOR CALENDAR EVENT CONFLICT RESOLUTION

(71) Applicant: Microsoft Technology Licensing, LLC, Redmond, WA (US)

(72) Inventors: Pamela Bhattacharya, Redmond, WA (US); Charles Yin-Che Lee, Mercer Island, WA (US); Warren David Johnson, III, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 301 days.

(21) Appl. No.: 16/298,946

(22) Filed: Mar. 11, 2019

(65) Prior Publication Data

US 2020/0293999 A1    Sep. 17, 2020

(51) Int. Cl.
    *G06Q 10/10*    (2012.01)
    *G06N 20/00*    (2019.01)
    *G06F 3/0484*   (2022.01)

(52) U.S. Cl.
    CPC ......... *G06Q 10/1095* (2013.01); *G06N 20/00* (2019.01); *G06F 3/0484* (2013.01)

(58) Field of Classification Search
    None
    See application file for complete search history.

(56) References Cited

U.S. PATENT DOCUMENTS

| 7,283,970 | B2  | 10/2007 | Cragun et al. |
| 7,343,312 | B2  | 3/2008  | Capek |
| 8,407,281 | B2* | 3/2013  | Howard ................. G06Q 10/06 709/203 |
| 9,626,659 | B2  | 4/2017  | Bathiya |
| 10,984,391 | B2* | 4/2021 | Gorzela ............. G06Q 10/1095 |
| 2005/0177404 | A1 | 8/2005 | Hyttinen |
| 2006/0053044 | A1 | 3/2006 | Kurian et al. |
| 2007/0005409 | A1 | 1/2007 | Boss et al. |
| 2008/0033778 | A1 | 2/2008 | Boss et al. |

(Continued)

OTHER PUBLICATIONS

"International Search Report and Written Opinion Issued in PCT Application No. PCT/US2020/020717", dated May 19, 2020, 10 Pages.

(Continued)

*Primary Examiner* — Stephanie Z Delich

(57) ABSTRACT

In non-limiting examples of the present disclosure, systems, methods and devices for prioritizing calendar events with artificial intelligence are presented. A request to schedule a new calendar event for a specified period may be received. A conflicting calendar event during the specified time period may be identified. An event priority score for the new calendar event may be compared with an event priority score for the conflicting calendar event, wherein the event priority scores are generated via application of a statistical machine learning model to a plurality of factors associated with the new calendar event and the conflicting calendar event. A selectable option to replace the conflicting calendar event with the new calendar event may be presented if the event priority score for the new calendar event is higher than the event priority score for the conflicting calendar event.

20 Claims, 9 Drawing Sheets

(56) References Cited

U.S. PATENT DOCUMENTS

| | | | |
|---|---|---|---|
| 2008/0243582 A1* | 10/2008 | Chen | G06Q 10/109 |
| | | | 705/7.19 |
| 2008/0294483 A1 | 11/2008 | Williams | |
| 2009/0055235 A1* | 2/2009 | Oral | G06Q 10/06314 |
| | | | 705/7.24 |
| 2009/0165022 A1* | 6/2009 | Madsen | G06Q 10/109 |
| | | | 719/318 |
| 2009/0210351 A1* | 8/2009 | Bush | G06Q 50/188 |
| | | | 705/80 |
| 2014/0188541 A1* | 7/2014 | Goldsmith | H04L 67/306 |
| | | | 705/7.19 |
| 2016/0364697 A1 | 12/2016 | Bouz et al. | |
| 2017/0178080 A1 | 6/2017 | Abebe et al. | |
| 2017/0308866 A1* | 10/2017 | Dotan-Cohen | H04L 43/0876 |
| 2017/0372267 A1 | 12/2017 | Soffer et al. | |
| 2018/0089633 A1 | 3/2018 | Johnson et al. | |
| 2018/0101823 A1 | 4/2018 | Nelson et al. | |
| 2018/0336533 A1* | 11/2018 | Avalos Vega | G06Q 10/1095 |
| 2019/0130329 A1* | 5/2019 | Fama | G06Q 10/06311 |
| 2019/0213557 A1* | 7/2019 | Dotan-Cohen | G06Q 10/1093 |

OTHER PUBLICATIONS

Somasundaram, Muthu, "New: Schedule Meetings with the Alexa Smart Scheduling Assistant", Retrieved from: https://aws.amazon.com/blogs/business-productivity/new-schedule-meetings-with-the-alexa-smart-scheduling-assistant/, May 22, 2018, 5 Pages.

* cited by examiner

ARTIFICIAL INTELLIGENCE FOR CALENDAR EVENT CONFLICT RESOLUTION

BACKGROUND

Electronic calendars have become ubiquitous in everyday work and home life. Users are able to coordinate their own schedules using electronic calendars, and with internet connectivity, they are able to interact with other users' calendars via the sending and receiving of electronic calendar event invitations. Although electronic calendars have made keeping track of events and schedules a much easier task than was previously possible, user's calendars often get booked up with low priority events that require manual intervention to re-arrange should higher priority events need to take their place.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for prioritizing calendar events with artificial intelligence. Users may utilize an electronic calendar service to schedule new events. The users may provide the electronic calendar service with natural language booking requests that provide temporal windows of potential meeting slots that may already be booked for one or more potential attendees. For example, when the electronic calendar service receives new event requests, one or more of the potential attendees, including the organizer and the invitees, may already have one or more conflicting events scheduled during the identified time windows. According to examples, a statistical machine learning model, such as a feature selection model, may be applied to a plurality of factors associated with each of the events. Those factors may include event parameters (e.g., duration of event, time and day of event, location of event, etc.). Those factors may also include one or more attributes of potential attendees of the events (e.g., seniority of attendees, organizational title of attendees, office location of attendees, etc.). An event priority score can then be generated for each of the events, and those events can be ranked according to their relative scores. The lower-ranked events can be replaced with higher ranked events that conflict with them. The machine learning model may utilize a feedback loop that takes user feedback about the machine-rankings into account, and the machine learning model may thus be modified accordingly.

BRIEF DESCRIPTION OF THE DRAWINGS

Non-limiting and non-exhaustive examples are described with reference to the following figures.

DETAILED DESCRIPTION

Figure 1:
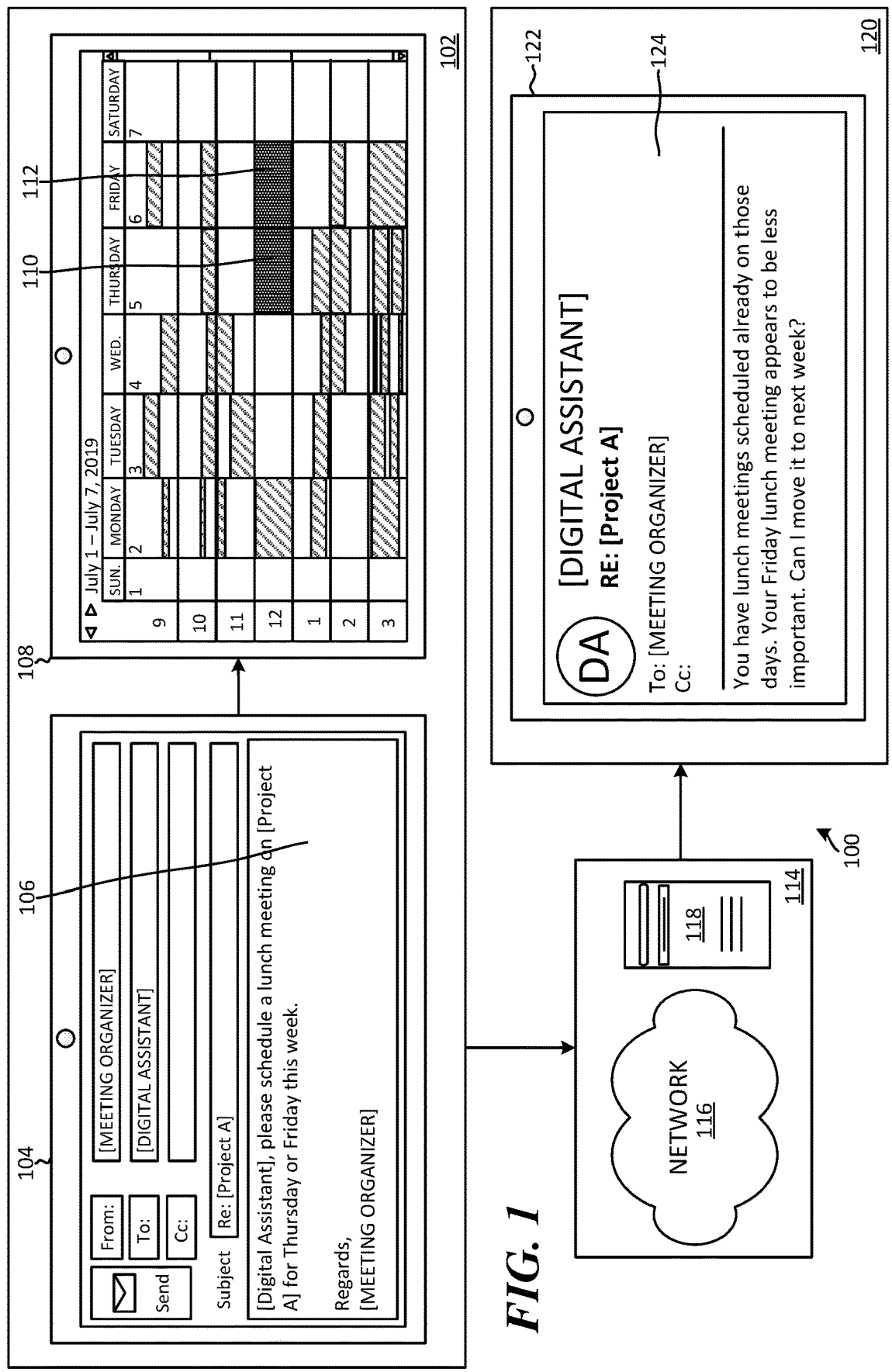
FIG. 1 is a schematic diagram illustrating an example distributed computing environment for prioritizing calendar events with artificial intelligence.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for prioritizing calendar events with artificial intelligence. According to examples, users may utilize an electronic calendar service to schedule and keep track of their events/meetings. When users of the electronic calendar service schedule new events they may utilize a digital calendar assistant associated with the service that uses a natural language processing engine. The digital calendar assistant may use the natural language processing engine to identify event/meeting intents associated with the scheduling of new events and automate the scheduling process. However, when one or more potential invitees of an event have conflicting events already on their calendars, the service would typically have had to either pick a time that falls outside of the identified meeting intent or move one of the conflicting meetings to a different time from which it was already scheduled.

The systems, methods, and devices described herein provide mechanisms for prioritizing events on users' calendars, alone and/or in the context of other users, such that meetings can be ranked and processed for moving appropriately when conflicts arise. In some examples, when a new event conflicts with one or more previously scheduled/existing events on a user's calendar, the electronic calendar service may identify one, two, three or more times for scheduling the new event and present those times to the user. The electronic calendar service may only present times to users for previously booked events that have lower event priority scores compared with the new event. The event priority score for each event may be generated by the electronic calendar service via application of one or more machine learning models. In one example, the electronic calendar service may apply a feature selection model to a plurality of factors associated with each event in generating the event priority scores. The electronic calendar service may also calculate a confidence score corresponding to a confidence that a user will likely prioritize one meeting over another. In some examples, for a first event to be automatically replaced with a second event on a user's calendar (or for the first event to be presented to the user and selected for replacing the second event), a calculated confidence score may have to meet a threshold (e.g., 0.7, 0.8, 0.9). In some examples, the machine learning model applied in generating the event priority scores may be trained with user feedback. For example, when a user accepts/agrees that an existing event should be replaced with a new event based on the new event having a calculated event priority score that is higher than the existing event, an unsupervised clustering model may be applied to cluster events with similar features to one or both of those events for making improved suggestions in the future.

In some examples, the electronic calendar service may automatically reschedule existing events that have an event priority score that is lower than new conflicting events with higher event priority scores. In other examples, the service may provide a selectable option to users to replace events when a conflicting event with a higher event priority score is received. In still other examples, the service may have settings associated with it such that users can select whether the decision to replace conflicting events is automatic or whether those users are to be presented with selectable options when conflicting events are received prior to the rescheduling.

The systems, methods, and devices described herein provide technical advantages for scheduling calendar events. Processing costs (CPU cycles) are reduced by minimizing the number of electronic messages that need to be sent from one user to another to schedule events. For example, where previously users would need to have a back-and-forth when one user's schedule conflicts with a new event, the current mechanisms allow automation of the scheduling process by automatically selecting lower priority events for moving when new higher priority events are received. By incorporating a feedback mechanism into the machine learning models that are applied to the meeting features to generate event priority scores, the mechanisms described herein may also make the prioritization of meetings even more efficient from a memory and processing standpoint. As the models become more accurate, the electronic calendar service will as a result receive less negative feedback, therefore making the system as a whole more efficient. Memory costs associated with keeping conflicting meetings on a user's calendar are also minimized, as the conflicting meetings can be automatically moved to non-conflicting spots.

FIG. 1 is a schematic diagram illustrating an example distributed computing environment 100 for prioritizing calendar events with artificial intelligence. Computing environment 100 includes new calendar event sub-environment 102, event conflict resolution sub-environment 120, and network and processing sub-environment 114. Network and processing sub-environment 114 includes network 116, which any of the devices shown in FIG. 1 may utilize to communicate with one another. In some examples, network and processing sub-environment 114 may host an electronic calendar service and/or a digital assistant service associated with an electronic calendar service. These services may be hosted by one or more server computing devices, such as server computing device 118.

An event organizer has utilized computing device 104 in new calendar event sub-environment 102 to draft electronic message 106 and send that message 106 to a digital assistant associated with the electronic calendar service. Specifically, the meeting organizer has included [DIGITAL ASSISTANT] in the "To" field of the message 106, with a subject of "Re: [Project A]". The body of the message 106 states: "[DIGITAL ASSISTANT], please schedule a lunch meeting on [PROJECT A] for Thursday or Friday this week. Regards, [MEETING ORGANIZER]". Computing device 108 displays a calendar associated with a potential attendee of the "Project A" meeting that the meeting organizer is attempting to setup. The calendar may be the calendar of a potential invitee of the "Project A" meeting, or it may be the calendar of the meeting organizer. Regardless, as illustrated by first conflicting event 100 and second conflicting event 112, the potential attendee does not have any available time to meet during the period of time specified in electronic message 106. That is, the calendar displayed on computing device 108 indicates that the potential attendee already has events scheduled for Thursday and Friday this week at lunch (i.e. 12-1 pm).

In some examples, the calendar information (e.g., information about what calendar events are already scheduled) for the potential attendee may be stored on a local computing device 108, a remote storage device (e.g., such as part of the electronic calendar service executed on server computing device 118), or both. Regardless of the location of the calendar information for the potential attendee, the electronic calendar service may generate event priority scores for the potential attendee's calendar events. In some examples, the calendar service may generate the event priority scores for each calendar event on the potential attendee's calendar. In other examples, the calendar service may only generate the event priority scores for calendar events when a determination is made that a new proposed event conflicts with an existing event.

According to examples, the event priority score for an event may be determined based on analysis of one or more parameters associated with the calendar event itself and/or one or more attributes of one or more potential attendees of the event. The electronic calendar service may extract these features from information included in an event invite/request, an electronic message containing an event invite/request, and/or one or more user accounts associated with the electronic calendar service. In some examples, the parameters associated with the calendar event itself that are utilized to generate an event priority score may include one or more of: a time when an event was booked (i.e., when an organizing user sent the event invite); an agenda associated with an event; a duration associated with an event; a location where an event is to be held; a type of attendance requested for an event (e.g., in-person, electronic); a time of day that an event is to be held; a day of the week when an event is to be held; and/or an event history of an event (e.g., has the event already been rescheduled, how many times has an event been rescheduled, etc.).

In some examples, a user store may be associated with the electronic calendar service. The user store may include information associated with users of the electronic calendar service. That information may be provided to the electronic calendar service and/or the user store based on an opt-in policy that a user must manually select in order for the service to obtain the information. In examples, the user store may include information associated with electronic calendar users, including: a seniority of a user within an organization; a tenure of a user within an organization; a salary range of a user within an organization; performance review data for a user within an organization; a geographic office location of a user; and/or an organizational title of a user. One or more of these attributes may thus be utilized by the electronic calendar service in generating an event priority score for an event.

In generating the event priority score for an event, the electronic calendar service may apply a machine learning model to one or more of the event attendee attribute datapoints and/or one or more of the event parameter datapoints. In some examples, the machine learning model may comprise a statistical machine learning model. In specific examples, the machine learning model may comprise a feature selection model, such as a Bayesian model. In still additional examples, a t-test (e.g., Welch's t-test, student's t-test) may be applied to one or more calendar events and a Bayesian model may then be subsequently applied to the one or more datapoints of the one or more calendar events. The machine learning model may be trained to generate a score reflecting the relative importance of a calendar event to a user—that score (i.e., the event priority score) is indicative of how likely a user is to prioritize the event when another event conflicts with it. In additional examples, a confidence score may be applied an event corresponding to a likelihood that a user would prefer to replace that event with a different event having a specific event priority score.

In this example, the electronic calendar service has generated an event priority score for first conflicting event 100, second conflicting event 112, and the new event proposed via electronic message 106. Although the scores for each of those events are not shown, the electronic calendar service has compared each of the scores and made a determination that second conflicting event 112 has a lower event priority score to the potential attendee (in this example the meeting organizer), and therefore the electronic calendar service provides the potential attendee with an option to replace conflicting event 112 with the new event associated with electronic message 106. This is illustrated by electronic message 124 displayed on computing device 122 in event conflict resolution sub-environment 120. Specifically, electronic message 124, from [DIGITAL ASSISTANT] to the potential attendee (the organizer) states: "You have lunch meetings scheduled already on those days. Your Friday lunch meeting appears to be less important. Can I move it to next week?" The meeting organizer may then either reply in the affirmative, which would result in the new event replacing second conflicting event 112, and the providing of positive feedback to the machine learning model that was utilized to generate the event priority scores for the three events at issue. Alternatively, the meeting organizer may reply in the negative, which would result in the electronic calendar service sending another message to the meeting organizer to ask whether one or more alternative events (e.g., first conflicting event 110) can be replaced by the new event. In that scenario, the machine learning model may receive the negative user feedback, modify one or more features of the model, and in some examples, generate new event priority scores for one or more calendar events on the organizer's electronic calendar. Although in this example, the electronic calendar service only presents the user with the conflict the opportunity to replace the timeslot with the lowest ranked event, in other examples the service may present the user with multiple options, including timeslots that do not have any events currently booked in them, but that fall outside of a desired meeting intent (e.g., Tuesday or Wednesday from 12-1 pm).

Figure 2:
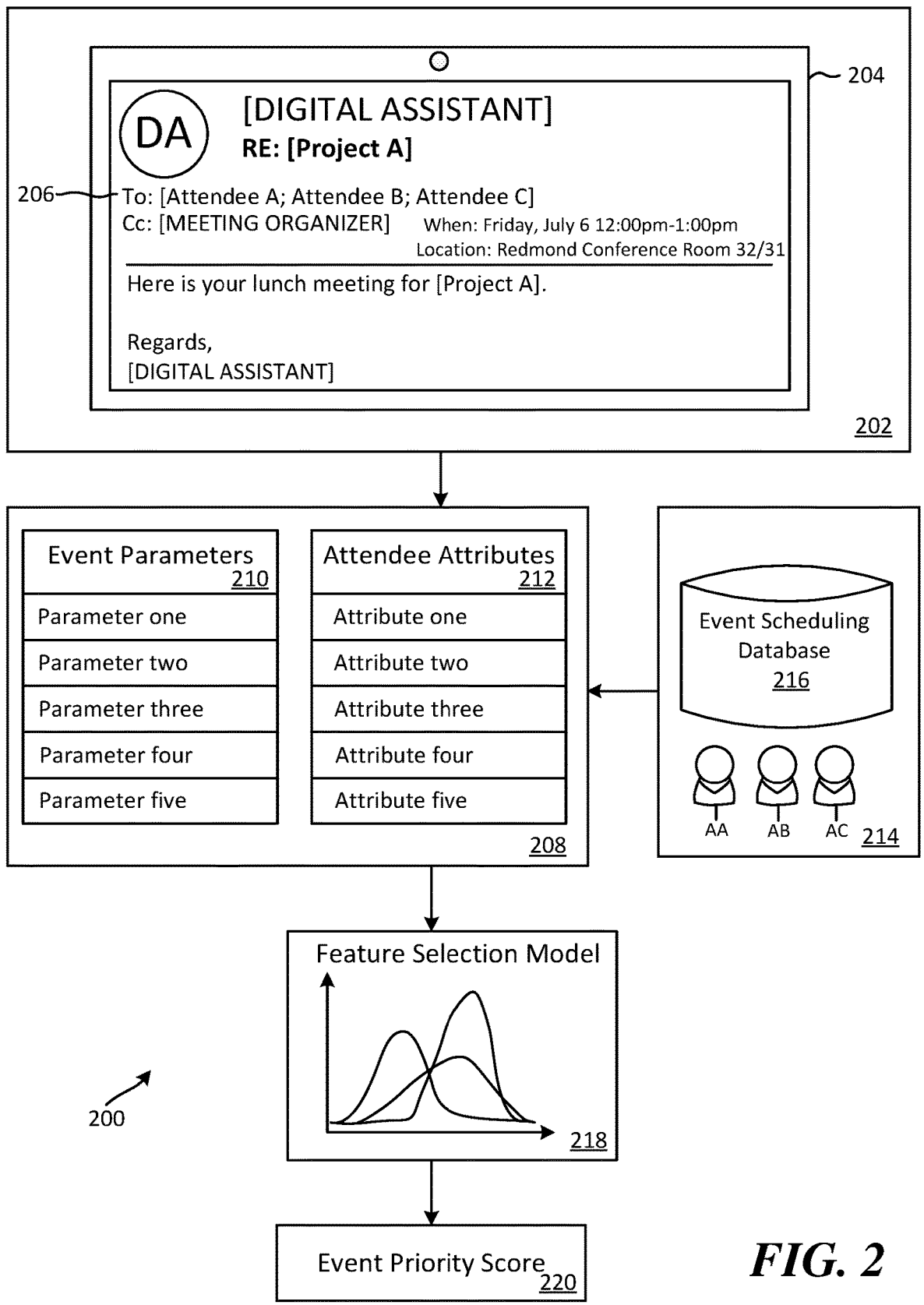
FIG. 2 illustrates the utilization of a machine learning model for generating event priority scores based on calendar event parameters and attendee attributes.

FIG. 2 is a simplified diagram 200 illustrating the utilization of a machine learning model for generating event priority scores based on calendar event parameters and attendee attributes. Diagram 200 includes new meeting sub-environment 202, event factors sub-environment 208, event scheduling database sub-environment 214, feature selection model 218, and event priority score 220.

As illustrated by calendar event confirmation 206 displayed on computing device 204 in new meeting sub-environment 202, a meeting with three attendees has been scheduled. The attendees of the meeting are Attendee A; Attendee B; and Attendee C. Calendar event confirmation 206 also indicates that the meeting is to take place at a geographic location (i.e., "Redmond Conference Room 32/31" on Friday, July 6 from 12:00 pm to 1:00 pm. Additionally, the body of calendar event confirmation 206 states: "Here is your lunch meeting for [Project A]. Regards, [DIGITAL ASSISTANT]".

According to examples, the electronic calendar service may extract one or more features from calendar event confirmation 206 and/or one or more messages associated with calendar event confirmation 206 (e.g., messages from the organizer setting the meeting up, messages about the meeting amongst the attendees, etc.), and the extracted information may be utilized in generating an event priority score for the lunch meeting. Additionally, event scheduling database 216 (also referred to herein as "user store") may include attendee attributes for each of Attendee A, Attendee B, and Attendee C. Thus, the calendar event service may not only extract features from event confirmation 206 and corresponding messages, but also from event scheduling database 216. In this example, these features are shown for ease of illustration as being divided into event parameters 210 and attendee attributes 212. The event parameters may comprise one or more of: a time when the event was booked, an agenda associated with the event, a duration of time associated with the event (i.e., how long the meeting is scheduled for), a location where the event is to be held, a type of attendance requested for the event, a time of day when the event is to be held, a day of the week when the event is to be held, and/or an event history of the event (e.g., has the event already been rescheduled; it may be less desirable to move events if they have already been rescheduled one or more times). The attendee attributes 212, which may be received via event scheduling database 216, may comprise one or more of: a seniority of a potential attendee within an organization, a tenure of a potential attendee within an organization, a salary range of a potential attendee within an organization, performance review data for a potential attendee within an organization, a geographic office location of a potential attendee, and/or an organizational title of a potential attendee.

One or more of the event parameters 210 and the attendee attributes 212 may be provided to a machine learning model. In this example, those features are provided to feature selection model 218, which is utilized to generate an event priority score 220 for each of the attendees (i.e., Attendee A, Attendee B, Attendee C). That is, each of the attendees may prioritize meetings differently, and therefore this same lunch meeting may have three different event priority scores based on the context of each attendee. Thus, if one or more of the attendees have an event that conflicts with this event, a personalized event priority score for this event can be compared against a personalized event priority score for the conflicting event.

Figure 3:
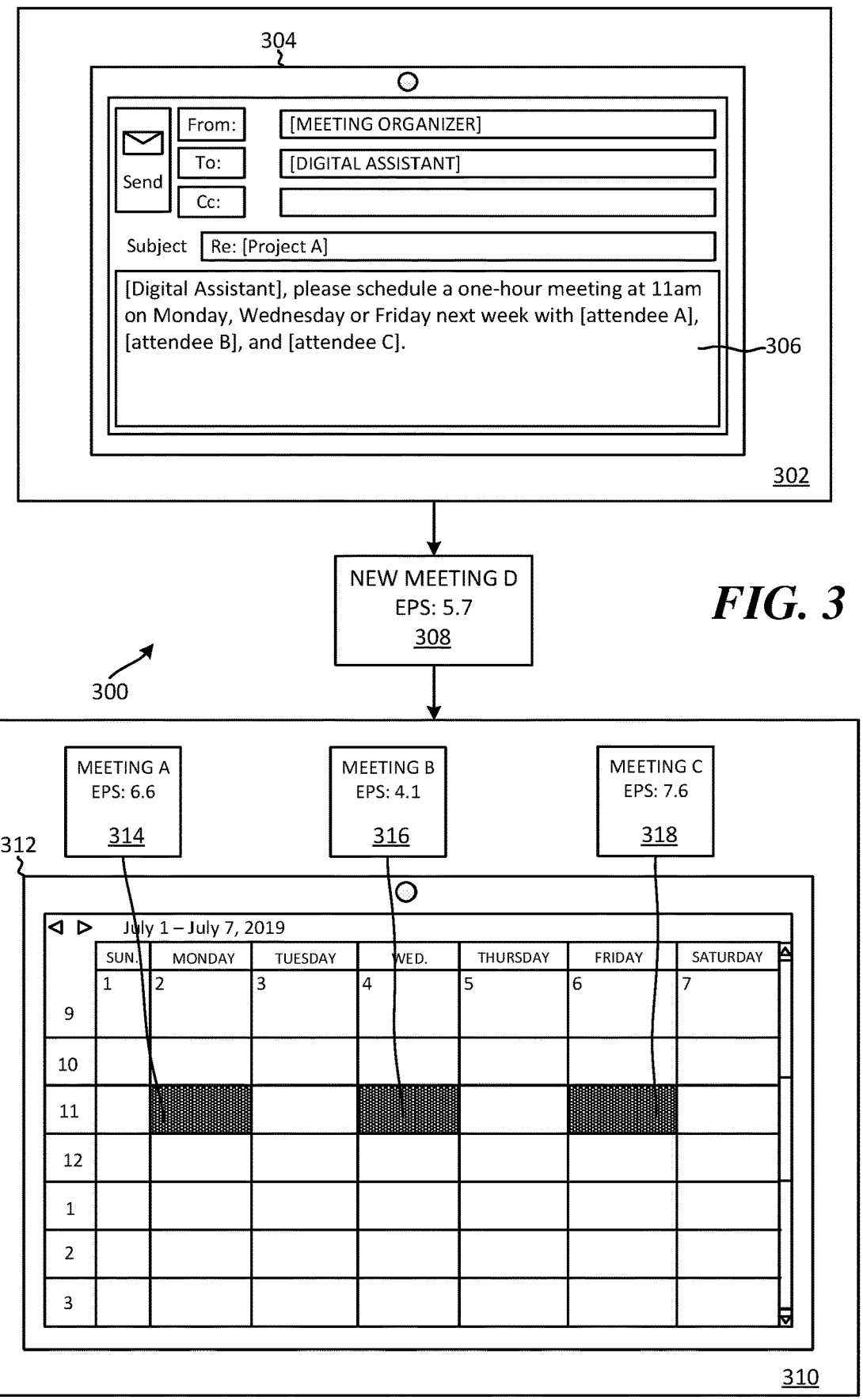
FIG. 3 illustrates the potential replacement of a conflicting calendar event with a new calendar event based on relative event priority scores.

FIG. 3 is a diagram 300 illustrating the potential replacement of a conflicting calendar event with a new calendar event based on event priority scores. Diagram 300 includes new calendar event sub-environment 302, new meeting element 308, and existing calendar event sub-environment 310. A meeting organizer has drafted and sent email 306 to [DIGITAL ASSISTANT]. The digital assistant is listed in the "To" field of email 306, the "Subject" field is "Re: [Project A]" and the body states: "[Digital Assistant], please schedule a one-hour meeting at 11 am on Monday, Wednesday or Friday next week with [attendee A], [attendee B], and [attendee C]." In this example, the meeting organizer may be one of attendees A, B, or C.

The electronic calendar service has generated an event priority score (EPS 5.7) for the new event, as indicated by new meeting element 308. The event priority score generated for the new event (meeting D) corresponds to the attendee whose calendar is displayed on computing device 312 in existing calendar event sub-environment 310, which has conflicting events for each of the days and times that the new event has been requested to be scheduled at. Specifically, the calendar displayed on computing device 312 indicates that meeting A 314, with an event priority score of 6.6, is currently filling the Monday from 11 am-12 pm spot; meeting B 316, with an event priority score of 4.1, is currently filling the Wednesday from 11 am-12 pm spot; and meeting C 318, with an event priority score of 7.6, is currently filling the Friday from 11 am-12 pm spot. Thus, prior to requesting the scheduling of the new event (meeting D), the organizer already had existing events taking up the timeslots in the scheduling request.

Figure 4:
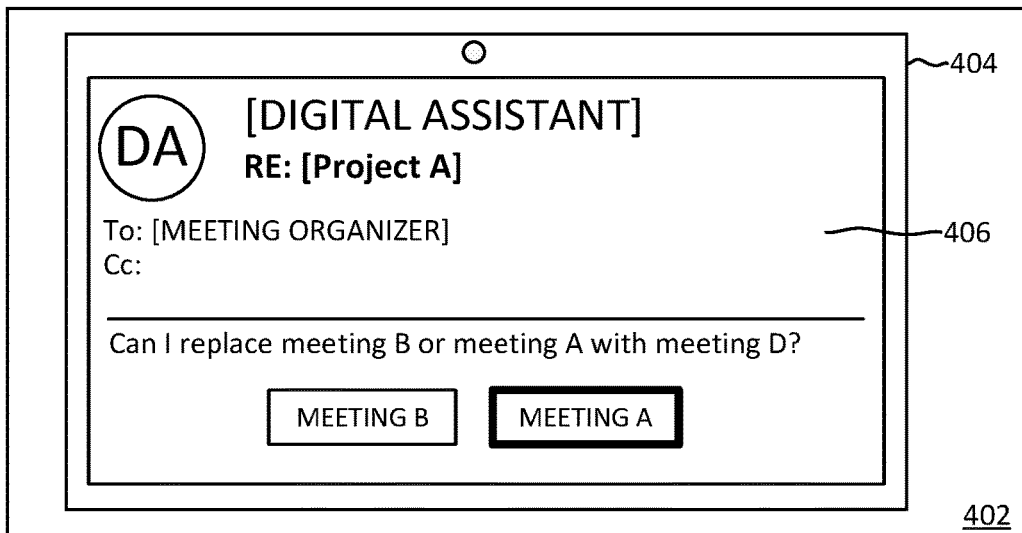
FIG. 4 illustrates the training of a feature selection machine learning model based on human interaction, which causes event priority scores for a plurality of events to be modified.
Figure 4:
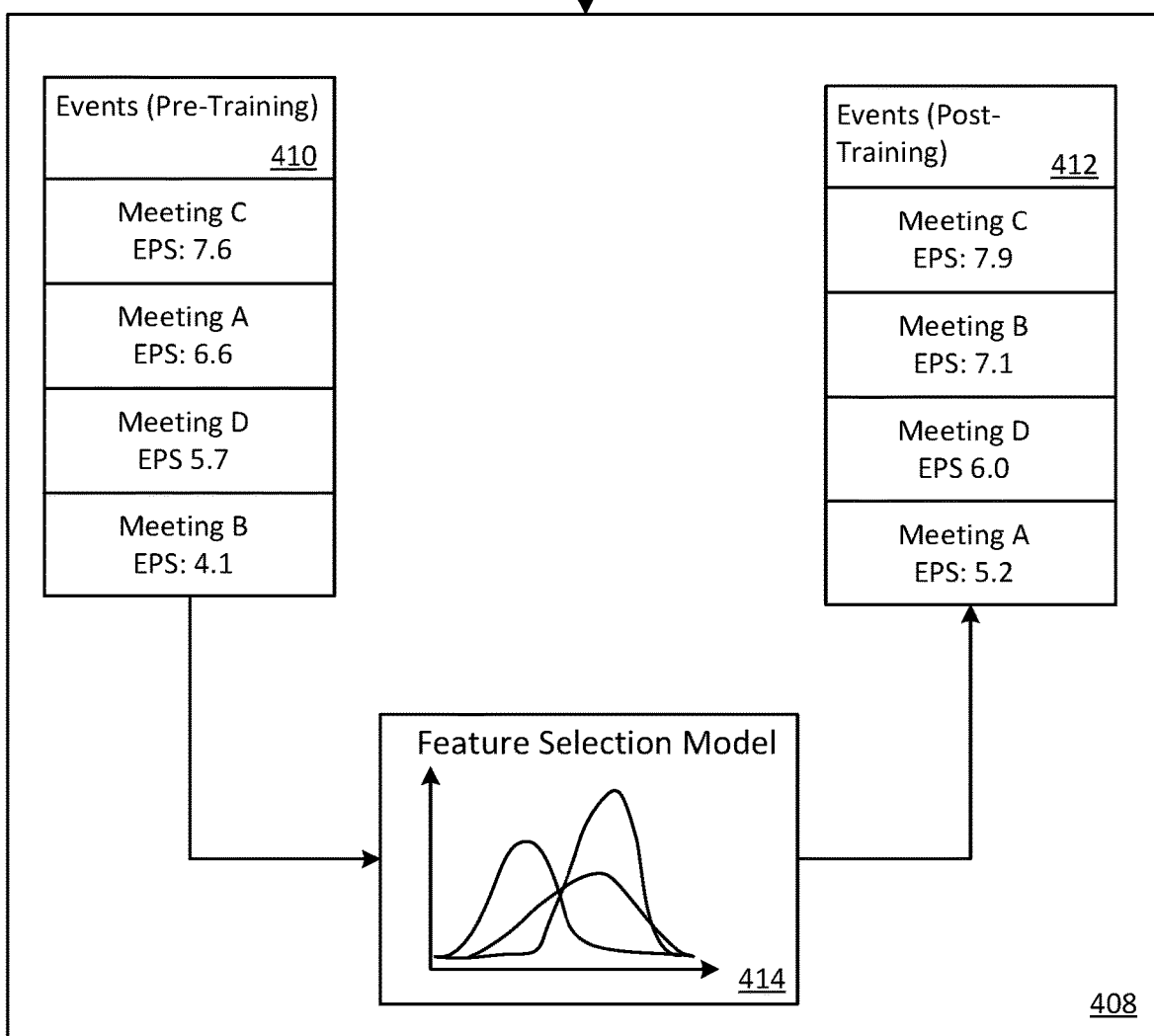

FIG. 4 is a diagram 400 illustrating the training of a feature selection machine learning model based on human interaction, which causes event priority scores for a plurality of events to be modified. Diagram 400 includes meeting replacement sub-environment 402 and machine learning training sub-environment 408. The events/meetings illustrated in FIG. 4 correspond to the events/meetings shown in FIG. 3.

In this example, the electronic calendar service has responded to the new meeting request, via a digital assistant, as illustrated by email 406 displayed on computing device 404. Specifically, email 406, from the digital assistant to the meeting organizer, states: "Can I replace meeting B or meeting A with meeting D" and there are selectable options for the meeting organizer to select either meeting B or meeting A for replacement with the new event (meeting D). Thus, in this example, the calendar shown in FIG. 3 corresponds to the meeting organizer as the attendee of the meeting that has conflicts on each of Monday, Wednesday, and Friday.

On the left side of machine learning training sub-environment 408, each of the meetings (including new meting D) are arranged under events (pre-training) element 410 based on their ranks according to their event priority scores. Thus, meeting C is first with an event priority score of 7.6, meeting A is second with an event priority score of 6.6, meeting D is third with an event priority score of 5.7, and meeting B is fourth with an event priority score of 4.1. Based on these example pre-training event priority scores, it would appear that the meeting organizer would be most likely to agree to replace meeting B (with the lowest event priority score) with new meeting D. However, as indicated by the bolded outline of "Meeting A" on computing device 404, the meeting organizer has selected to replace meeting A with meeting D, despite the fact that meeting A has a higher event priority score associated with it (6.61) compared with the event priority score associated with meeting B (4.1).

In this example, the meeting organizer's feedback may be provided to feature selection model 414, and that model may be modified for one or more event features associated with the new event (meeting D). As such, the existing event priority scores for each of the events on the meeting organizer's calendar are recalculated using the updated feature selection model. This is illustrated by the event priority scores under events (post training) element 412 in machine learning training sub-environment 408. Specifically, meeting C now has an event priority score associated with it of 7.9 (up from 7.6 pre-training), meeting B now has an event priority score associated with it of 7.1 (up from 4.1 pre-training), meeting D now has an event priority score associated with it of 6.0 (up from 5.7 pre-training), and meeting A now has an event priority score associated with it of 5.2 (down from 6.6 pre-training). As an example, based on the training (i.e., the organizer selecting meeting A to be replaced by meeting D), feature selection model 414 may be modified because one or more of the meetings for which an event priority score went up share one or more features with meeting B, and/or one or more of the meetings for which an event priority score went down share one or more features with meeting A.

Figure 5:
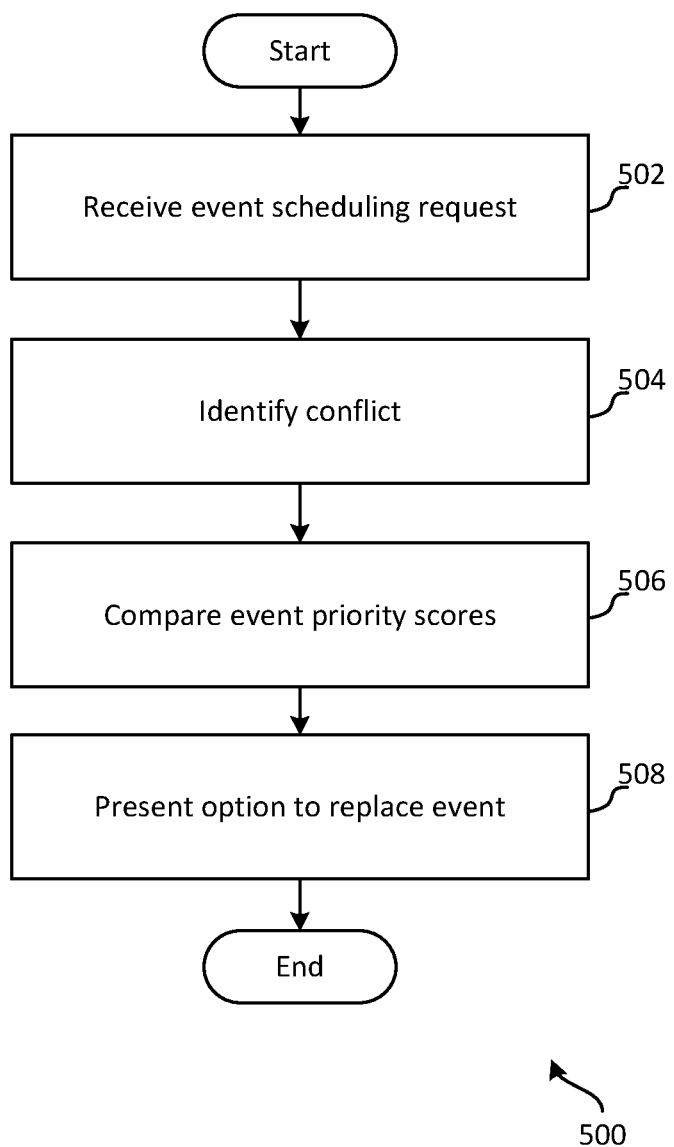
FIG. 5 is an exemplary method for prioritizing calendar events with artificial intelligence.

FIG. 5 is an exemplary method 500 for prioritizing calendar events with artificial intelligence. The method 500 begins at a start operation and flow moves to operation 502.

At operation 502 a request to schedule a new calendar event for a specified time period is received. The request may be received by an electronic calendar service from a user associated with that service (the "organizer"). According to some examples, the specified time period may be a duration of time that a user requests the meeting to be scheduled (e.g., between now and next week; Friday afternoon; Monday or Tuesday morning). In other examples, the specified time period may be more specific (e.g., Tuesday from 1 pm-2 pm; Friday from 9 am-10:15 am).

The electronic calendar service may store past events, pending events, and future events for users of the service, and information about those events (duration of event, location of event, invitees, attendees, whether an event was canceled, whether an event was moved, etc.). In additional examples, the electronic service may be associated with a user store that stores information about users of the electronic calendar service. In examples, users of the electronic calendar service may have to affirmatively opt-in to allow the user store to obtain and/or store information about them. In some examples the information in the user store may include: a seniority of a user in an organization, a tenure of a user in an organization, a salary range of a user in an organization, performance review data for a user, a geographic office location of a user, and an organizational title of a user, for example.

From operation 502 flow continues to operation 504 where a conflicting calendar event is identified during the specified time period. The conflicting calendar event is a previously scheduled calendar event that overlaps at least in part with the new calendar event. The conflict may be on one or more of the potential attendees' calendars, including the event organizer and the invitees.

From operation 504 flow continues to operation 506 where an event priority score for the new calendar event is compared with an event priority score for the conflicting calendar event. In examples, the event priority scores may be generated via application of a statistical machine learning model to a plurality of factors associated with the new calendar event and the conflicting calendar event. In some examples, the statistical machine learning model may comprise a feature selection model. In some examples, the feature selection model may comprise a Bayesian model. In still additional examples, a t-test, such as Welch's t-test, may be applied to one or more features of each of the conflicting calendar events prior to applying the statistical machine learning model to the features/datasets.

From operation 506 flow continues to operation 508 where a selectable option to replace the conflicting calendar event with the new calendar event is presented if the event priority score for the new calendar event is higher than the event priority score for the conflicting calendar event.

From operation 508 flow moves to an end operation and the method 500 ends.

Figure 6:
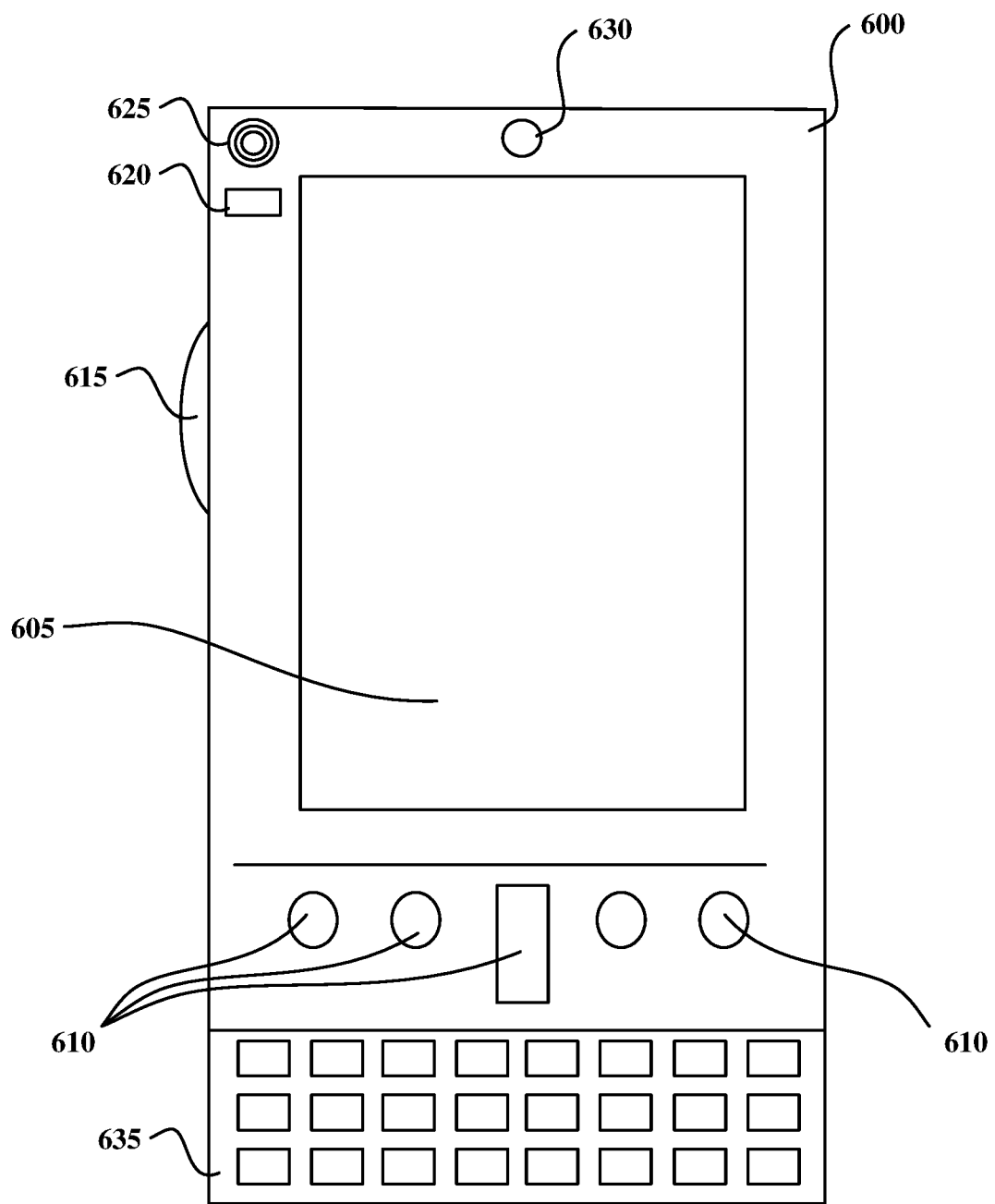
FIGS. 6 and 7 are simplified diagrams of a mobile computing device with which aspects of the disclosure may be practiced.
Figure 7:
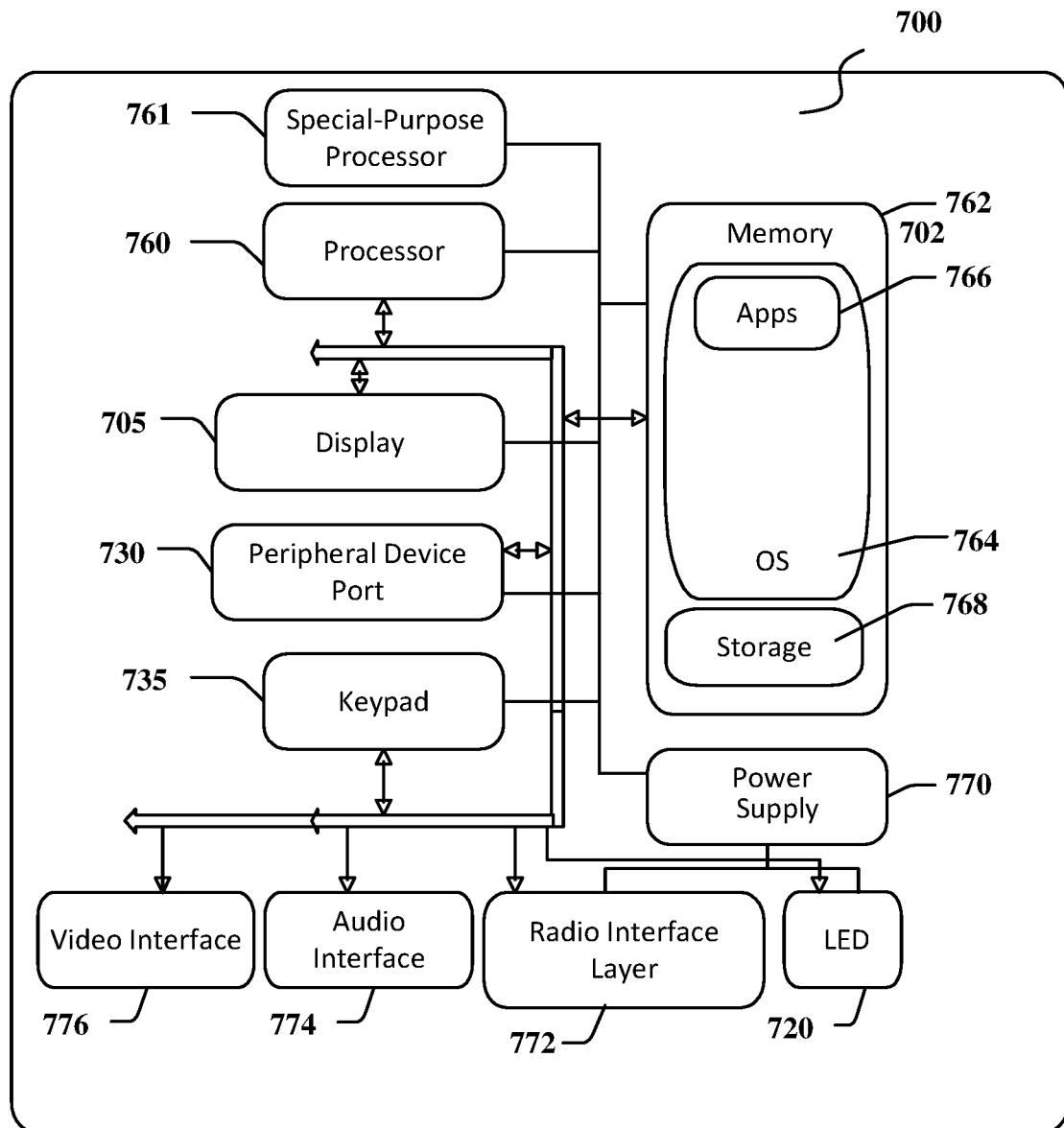

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
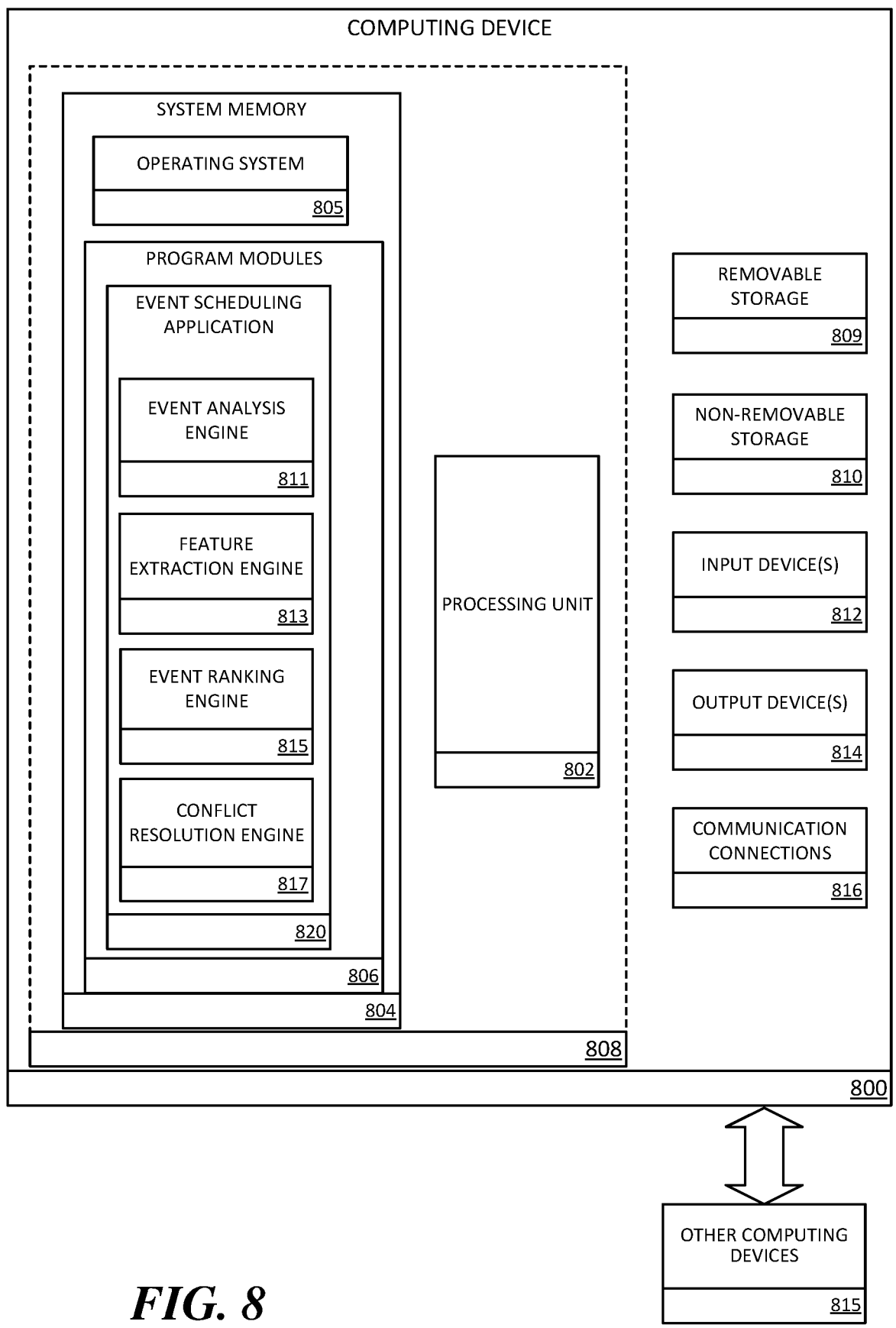
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for prioritizing calendar events with artificial intelligence. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more digital assistant programs and/or electronic calendar service programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., event scheduling application 820) may perform processes including, but not limited to, the aspects, as described herein. According to examples, event analysis engine 811 may analyze new events when they are received by the electronic calendar service and determine whether one or more other events conflict with the new events. Event analysis engine 811 may also apply one or more language processing models to new event requests and determine one or more event/meeting intents associated with those requests. Feature extraction engine 813 may extract features associated with new events and/or potential attendees of those events. Event ranking engine 815 may perform one or more operations associated with generating event priority scores for new and existing events. The event priority scores may be generated based on application of one or more machine learning models to the extracted features (e.g., event features and attendee attributes). Conflict resolution engine 817 may perform one or more operations associated with ranking new and existing events and prioritizing those events based on the rankings.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
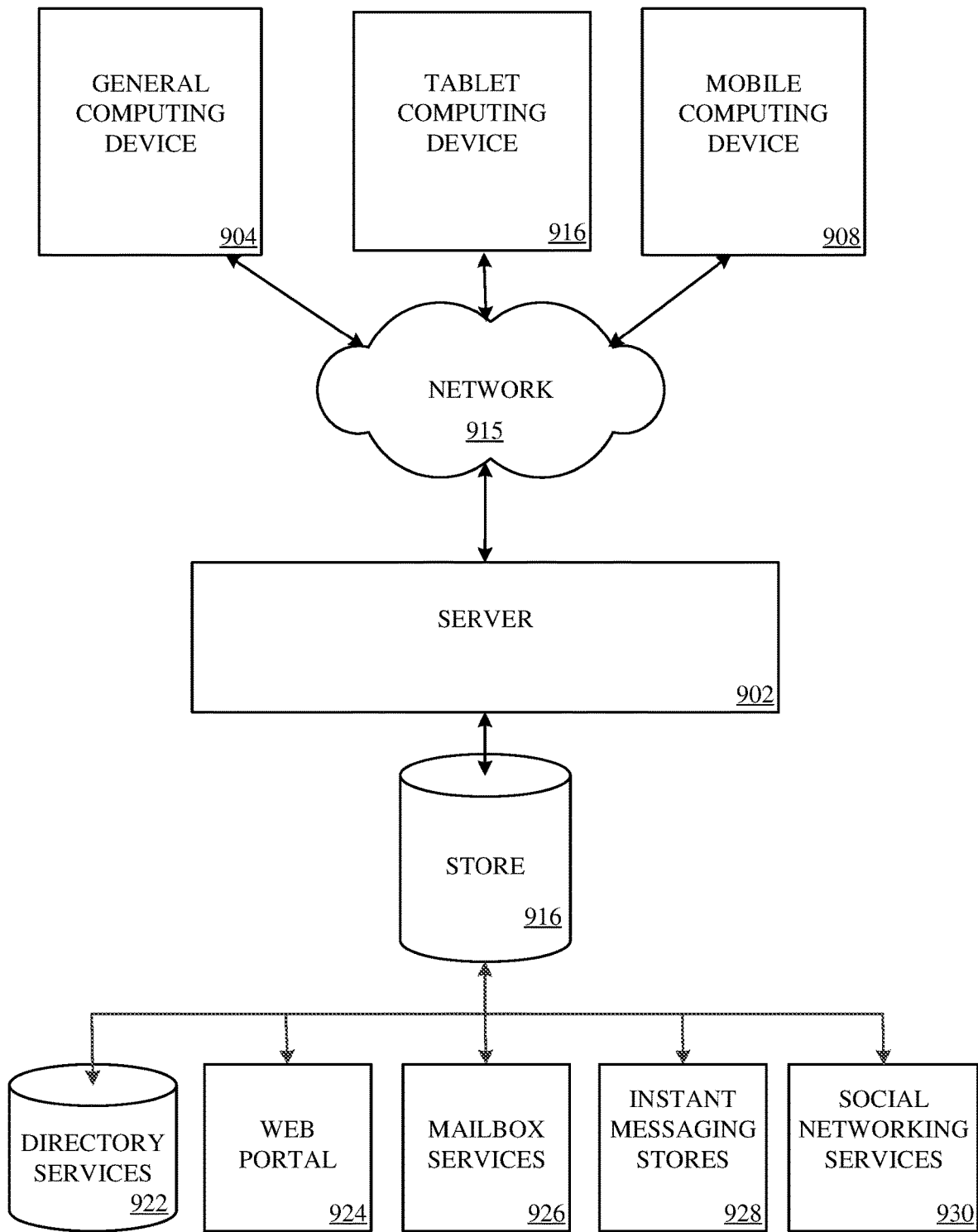
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for prioritizing calendar events with artificial intelligence, the computer-implemented method comprising:
   receiving a natural language request in an electronic message from a user;
   processing the natural language request with a natural language processing engine;
   identifying, with the natural language processing engine, that the natural language request includes an intent to schedule a new calendar event for a specified time period;
   identifying a conflicting calendar event during the specified time period;
   comparing an event priority score for the new calendar event with an event priority score for the conflicting calendar event, wherein the event priority scores are generated via application of a statistical machine learning model to a plurality of factors associated with the new calendar event and the conflicting calendar event;
   calculating, using the event priority score for the new calendar event and the event priority score for the conflicting calendar event, a confidence score corresponding to a likelihood that the user will prioritize the new calendar event over the conflicting calendar event;
   determining that the confidence score meets a threshold value;
   causing, based on the determination that the confidence score meets the threshold value, a selectable option to replace the conflicting calendar event with the new calendar event to be presented on an application user interface;
   receiving an indication that the selectable option has been selected from the application user interface;
   replacing the conflicting calendar event with the new calendar event;
   sending feedback from the selection of the selectable option and the replacement of the conflicting calendar event with the new calendar event to the statistical machine learning model;
   training the statistical machine learning model using the feedback; and
   clustering a plurality of calendar events based on the training.

2. The computer-implemented method of claim 1, wherein the plurality of factors comprises one or more attributes of one or more potential attendees of each of the new calendar event and the conflicting calendar event.

3. The computer-implemented method of claim 2, wherein the one or more attributes comprise at least one of: a seniority of a potential attendee within an organization; a tenure of a potential attendee within an organization; a salary range of a potential attendee within an organization; performance review data for a potential attendee within an organization; a geographic office location of a potential attendee; and an organizational title of a potential attendee.

4. The computer-implemented method of claim 1, wherein the plurality of factors comprises one or more event parameters of each of the new calendar event and the conflicting calendar event.

5. The computer-implemented method of claim 4, wherein the one or more event parameters comprise at least one of: a time when each event was booked; an agenda associated with each event; a duration associated with each event; a location where each event is to be held; a type of attendance requested for each event; a time of day when each event is to be held; a day of the week when each event is to be held; and an event history of each event.

6. The computer-implemented method of claim 5, wherein the type of attendance requested for each event comprises one of: an electronic attendance; and an in-person attendance.

7. The computer-implemented method of claim 1, wherein the statistical machine learning model is a feature selection model.

8. The computer-implemented method of claim 1, wherein the statistical machine learning model is a Bayesian model.

9. The computer-implemented method of claim 1, wherein the natural language request is received by a digital calendar assistant.

10. A computer-readable storage device comprising executable instructions that, when executed by one or more processors, prioritizing calendar events with artificial intelligence, the computer-readable storage device including instructions executable by the one or more processors for:
receiving a natural language request in an electronic message from a user;
processing the natural language request with a natural language processing engine;
identifying, with the natural language processing engine, that the natural language request includes an intent to schedule a new calendar event for a specified time period;
identifying a conflicting calendar event during the specified time period;
comparing an event priority score for the new calendar event with an event priority score for the conflicting calendar event, wherein the event priority scores are generated via application of a statistical machine learning model to a plurality of factors associated with the new calendar event and the conflicting calendar event;
calculating, using the event priority score for the new calendar event and the event priority score for the conflicting calendar event, a confidence score corresponding to a likelihood that the user will prioritize the new calendar event over the conflicting calendar event;
determining that the confidence score meets a threshold value;
causing, based on the determination that the confidence score meets the threshold value, a selectable option to replace the conflicting calendar event with the new calendar event to be presented on an application user interface;
receiving an indication that the selectable option has been selected from the application user interface;
replacing the conflicting calendar event with the new calendar event;
sending feedback from the selection of the selectable option and the replacement of the conflicting calendar event with the new calendar event to the statistical machine learning model;
training the statistical machine learning model using the feedback; and
clustering a plurality of calendar events based on the training.

11. The computer-readable storage device of claim 10, wherein the plurality of factors comprises one or more attributes of one or more invitees of each of the new calendar event and the conflicting calendar event.

12. The computer-readable storage device of claim 10, wherein the plurality of factors comprises one or more event parameters of each of the new calendar event and the conflicting calendar event.

13. The computer-readable storage device of claim 10, wherein the natural language request is received by a digital calendar assistant.

14. A system for prioritizing calendar events with artificial intelligence, comprising:
a memory for storing executable program code; and
one or more processors, functionally coupled to the memory, the one or more processors being responsive to computer-executable instructions contained in the program code and operative to:
receive a natural language request in an electronic message from a user;
process the natural language request with a natural language processing engine;
identify, with the natural language processing engine, that the natural language request includes an intent to schedule a new calendar event for a specified time period;
identify a conflicting calendar event during the specified time period;
compare an event priority score for the new calendar event with an event priority score for the conflicting calendar event, wherein the event priority scores are generated via application of a statistical machine learning model to a plurality of factors associated with the new calendar event and the conflicting calendar event;
calculate, using the event priority score for the new calendar event and the event priority score for the conflicting calendar event, a confidence score corresponding to a likelihood that the user will prioritize the new calendar event over the conflicting calendar event;
determine that the confidence score meets a threshold value;
cause, based on the determination that the confidence score meets the threshold value, a selectable option to replace the conflicting calendar event with the new calendar event to be presented on an application user interface;
receive an indication that the selectable option has been selected from the application user interface;
replace the conflicting calendar event with the new calendar event;
send feedback from the selection of the selectable option and the replacement of the conflicting calendar event with the new calendar event to the statistical machine learning model;
train the statistical machine learning model using the feedback; and
cluster a plurality of calendar events based on the training.

15. The system of claim 14, wherein the plurality of factors comprises one or more attributes of one or more potential attendees of each of the new calendar event and the conflicting calendar event.

16. The system of claim 15, wherein the one or more attributes comprise at least one of: a seniority of a potential attendee within an organization; a tenure of a potential attendee within an organization; a salary range of a potential attendee within an organization; performance review data for a potential attendee within an organization; a geographic office location of a potential attendee; and an organizational title of a potential attendee.

17. The system of claim 14, wherein the plurality of factors comprises one or more event parameters of each of the new calendar event and the conflicting calendar event.

18. The system of claim 17, wherein the one or more event parameters comprise at least one of: a time when each event was booked; an agenda associated with each event; a duration associated with each event; a location where each event is to be held; a type of attendance requested for each event; a time of day when each event is to be held; a day of the week when each event is to be held; and an event history of each event.

19. The system of claim 18, wherein the type of attendance requested for each event comprises one of: an electronic attendance; and an in-person attendance.

20. The system of claim 14, wherein the statistical machine learning model is a feature selection model.

\* \* \* \* \*